US012578005B2

(12) United States Patent
Nozaki

(10) Patent No.:  US 12,578,005 B2
(45) Date of Patent:      Mar. 17, 2026

(54) FLUID-FILLED VIBRATION DAMPING DEVICE

(71) Applicant: SUMITOMO RIKO COMPANY LIMITED, Komaki (JP)

(72) Inventor: Junichi Nozaki, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 489 days.

(21) Appl. No.: 18/172,379

(22) Filed: Feb. 22, 2023

(65) Prior Publication Data

US 2023/0323930 A1      Oct. 12, 2023

(30) Foreign Application Priority Data

Mar. 23, 2022    (JP) ................................. 2022-047426

(51) Int. Cl.
*F16F 13/10*          (2006.01)
*B60K 5/12*          (2006.01)

(52) U.S. Cl.
CPC .......... *F16F 13/106* (2013.01); *B60K 5/1283* (2013.01); *F16F 2228/066* (2013.01)

(58) Field of Classification Search
CPC ........ F16F 13/10; F16F 13/105; F16F 13/106; F16F 13/18; F16F 2230/183; F16F 9/516;
(Continued)

(56) References Cited

U.S. PATENT DOCUMENTS 4,711,206 A      12/1987  Andra et al.
8,474,799 B2 *    7/2013  Michiyama ........... F16F 13/106
                                                          267/140.13
(Continued)

FOREIGN PATENT DOCUMENTS

CN        101925755 A      12/2010
JP        2005-3184 A       1/2005
(Continued)

OTHER PUBLICATIONS

Jun. 14, 2025 Office Action issued in Chinese Patent Application No. 202310202091.6.

*Primary Examiner* — Robert A. Siconolfi
*Assistant Examiner* — Mahbubur Rashid
(74) *Attorney, Agent, or Firm* — Oliff PLC

(57)                ABSTRACT

A fluid-filled vibration damping device including: a pressure-receiving chamber; an equilibrium chamber; a partition partitioning the two chambers while including a communication aperture connecting the two chambers; and a rubber elastic plate arranged in the partition while covering the communication aperture. The rubber elastic plate includes: an outside contact-retainer part provided partially along a circumference at an outer edge of the rubber elastic plate while being held overlapped with the partition; an elastic deformation zone provided circumferentially between the outside contact-retainer part to become apart from the partition based on a pressure differential between the two chambers thereby allowing a fluid flow through the communication aperture; and a radial reinforcing rib projecting from a surface of the rubber elastic plate and extending radially outward from an inside contact-retainer part that is held overlapped with the partition toward the elastic deformation zone.

7 Claims, 8 Drawing Sheets

(58) Field of Classification Search
CPC ........ F16F 7/12; F16F 2228/066; F16F 7/085;
F16F 7/087; B60K 5/1208; B60K 5/1283
See application file for complete search history.

(56) References Cited

U.S. PATENT DOCUMENTS

| | | | | |
|---|---|---|---|---|
| 8,556,239 B2 * | 10/2013 | Okumura | .............. | F16F 13/106 |
| | | | | 267/140.13 |
| 8,807,544 B2 * | 8/2014 | Yamamoto | ............ | F16F 13/106 |
| | | | | 267/140.13 |
| 8,864,114 B2 * | 10/2014 | Masuda | ................ | F16F 13/106 |
| | | | | 267/140.13 |
| 8,876,093 B2 * | 11/2014 | Kubo | .................... | F16F 13/106 |
| | | | | 267/140.13 |
| 9,506,522 B2 | 11/2016 | Komiya et al. | | |
| 2005/0035508 A1 | 2/2005 | Inoue | | |
| 2010/0201053 A1 | 8/2010 | Okumura et al. | | |
| 2016/0195154 A1 * | 7/2016 | Komiya | ............... | F16F 13/106 |
| | | | | 267/140.13 |
| 2021/0270344 A1 * | 9/2021 | Kondo | ................. | F16F 13/106 |
| 2021/0317894 A1 * | 10/2021 | Yamamoto | ........... | F16F 13/107 |

FOREIGN PATENT DOCUMENTS

| | | | | |
|---|---|---|---|---|
| JP | 2007-278434 A | 10/2007 | | |
| JP | 4169358 B2 | 10/2008 | | |
| JP | 2021165583 A | * 10/2021 | ............. | F16F 13/26 |

* cited by examiner

UP

LEFT ⟷ RIGHT

DOWN

BACK

LEFT ←——→ RIGHT

FRONT

FRONT

RIGHT ←——→ LEFT

BACK

BACK

LEFT ←——→ RIGHT

FRONT

FLUID-FILLED VIBRATION DAMPING DEVICE

INCORPORATED BY REFERENCE

The disclosure of Japanese Patent Application No. 2022-047426 filed on Mar. 23, 2022 including the specification, drawings and abstract is incorporated herein by reference in its entirety.

BACKGROUND ART

1. Technical Field

The present disclosure relates to a fluid-filled vibration damping device used for an automotive engine mount or the like.

2. Description of the Related Art

Conventionally, a fluid-filled vibration damping devices used for an automotive engine mounts and the like has been known. The fluid-filled vibration damping device, for example, as disclosed in U.S. Patent No. U.S. Pat. No. 9,506,522 B2, includes a pressure-receiving chamber and an equilibrium chamber whose interiors are filled with a non-compressible fluid, and exhibits vibration damping effect based on the flow action of the filled fluid or the like.

Besides, in U.S. Pat. No. 9,506,522 B2, the pressure-receiving chamber and the equilibrium chamber are partitioned by a partition, and the partition is provided with a communication aperture that permits communication between the pressure-receiving chamber and the equilibrium chamber. A rubber elastic plate that covers the communication aperture in a closed state is also provided. The rubber elastic plate elastically deforms based on relative pressure fluctuations between the pressure-receiving chamber and the equilibrium chamber so as to cancel the closed state of the communication aperture, thereby allowing communication between the pressure-receiving chamber and the equilibrium chamber through the communication aperture.

SUMMARY

In the structure of U.S. Pat. No. 9,506,522 B2, it is necessary to control the presence or absence, the degree, and the like of deformation of the rubber elastic plate with respect to the magnitude of the relative pressure difference between the pressure-receiving chamber and the equilibrium chamber in order to effectively exhibit the vibration damping performance. Such control of deformation of the rubber elastic plate can be realized by, for example, adjusting the deformation rigidity of the rubber elastic plate.

However, regarding the rubber elastic plate of U.S. Pat. No. 9,506,522 B2, not only the opening and closing of the communication aperture, but also the minute pressure-fluctuation absorbing function (the liquid-pressure absorbing function) due to the deformation of itself contributes to the vibration damping performance. Thus, it has become clear that if the deformation rigidity of the rubber elastic plate is adjusted by focusing only on the opening and closing operation of the communication aperture, the liquid-pressure absorbing function of the rubber elastic plate may deteriorate, and the desired vibration damping performance may not be obtained. In other words, in consideration of the liquid-pressure absorbing function of the rubber elastic plate, there is a risk that the degree of freedom in tuning the rigidity for controlling the deformation of the rubber elastic plate may be reduced, and sometimes it was difficult to match the switching characteristics of opening and closing the communication aperture to the required performance.

It is therefore one object of the present disclosure to provide a fluid-filled vibration damping device of novel structure which is able to control the deformation of the rubber elastic plate with a large degree of freedom while suppressing the influence due to the deformation of the rubber elastic plate on the minute pressure-fluctuation absorbing function.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a fluid-filled vibration damping device comprising: a pressure-receiving chamber and an equilibrium chamber which are filled with a non-compressible fluid; a partition partitioning the pressure-receiving chamber and the equilibrium chamber, the partition being provided with a communication aperture through which the pressure-receiving chamber and the equilibrium chamber are held in communication; and a rubber elastic plate arranged in the partition such that the communication aperture is covered from a pressure-receiving chamber side, the rubber elastic plate being configured to undergo elastic deformation due to a differential between pressures in the pressure-receiving chamber and the equilibrium chamber exerted on respective surfaces of the rubber elastic plate such that a minute pressure-fluctuation absorbing function is exhibited based on the elastic deformation, wherein the rubber elastic plate comprises: an outside contact-retainer part provided partially along a circumference at a radially outer edge of the rubber elastic plate, the outside contact-retainer part being held in an overlapped state with the partition; an elastic deformation zone provided circumferentially between the outside contact-retainer part of the rubber elastic plate, the elastic deformation zone being configured to become apart from the partition based on the differential between the pressures in the pressure-receiving chamber and the equilibrium chamber such that a fluid flow is allowed from the equilibrium chamber to the pressure-receiving chamber through the communication aperture; and a radial reinforcing rib projecting from at least one of the surfaces of the rubber elastic plate and extending radially outward from an inside contact-retainer part that is held in the overlapped state with the partition toward the elastic deformation zone.

According to the fluid-filled vibration damping device structured following the present preferred embodiment, the radial reinforcing rib is provided in the elastic deformation zone that opens the communication aperture to allow a fluid flow. This makes it possible to adjust the deformation rigidity of the elastic deformation zone by means of the radial reinforcing rib, thereby preventing unnecessary opening of the communication aperture, avoiding occurrence of a striking noise due to an excessive deformation of the elastic deformation zone, and the like.

In particular, the radial reinforcing rib extends radially outward from the inside contact-retainer part of the rubber elastic plate toward the elastic deformation zone. Thus, as will be described in detail in the practical embodiment, the radial reinforcing rib efficiently exerts an influence on the deformation rigidity of the elastic deformation zone in the thickness direction, while suppressing an influence of the radial reinforcing rib on the minute pressure-fluctuation absorbing function based on the elastic deformation of the rubber elastic plate, thereby effectively obtaining vibration damping performance due to the minute pressure-fluctuation absorbing function.

A second preferred embodiment provides the fluid-filled vibration damping device according to the first preferred embodiment, wherein a radially outer end of the radial reinforcing rib is positioned at a circumferential center of the elastic deformation zone.

According to the fluid-filled vibration damping device structured following the present preferred embodiment, the influence of the radial reinforcing rib on the deformation rigidity of the elastic deformation zone in the thickness direction is exerted in a balanced manner in the circumferential direction, so that, for example, it is possible to prevent the mode of deformation of the elastic deformation zone from being distorted by the influence of the radial reinforcing rib.

A third preferred embodiment provides the fluid-filled vibration damping device according to the first or second preferred embodiment, wherein a quantity of the radial reinforcing rib provided for the elastic deformation zone is one.

According to the fluid-filled vibration damping device structured following the present preferred embodiment, in comparison with the case where a plurality of radial reinforcing ribs are provided, the range in which the influence on the deformation rigidity due to the radial reinforcing rib is large can be limited in the circumferential direction, thereby readily suppressing the influence on the minute pressure-fluctuation absorbing function.

A fourth preferred embodiment provides the fluid-filled vibration damping device according to any one of the first to third preferred embodiments, wherein the radial reinforcing rib projects from the surface on an equilibrium chamber side of the rubber elastic plate.

According to the fluid-filled vibration damping device structured following the present preferred embodiment, by providing the radial reinforcing rib so as to project toward the equilibrium chamber, the radial reinforcing rib is likely to contribute to the rigidity during deformation toward the pressure-receiving chamber side when the elastic deformation zone opens the communication aperture. This makes it possible for the radial reinforcing rib to efficiently exert an influence on the switching characteristics of opening and closing the communication aperture and the like.

A fifth preferred embodiment provides the fluid-filled vibration damping device according to the fourth preferred embodiment, wherein an annular cushioning projection extending in a circumferential direction is provided on the surface on the equilibrium chamber side of the rubber elastic plate, and a projection height dimension of the radial reinforcing rib is smaller than that of the annular cushioning projection.

According to the fluid-filled vibration damping device structured following the present preferred embodiment, for example, when the rubber elastic plate strikes the partition from a state away toward the pressure-receiving chamber side due to deformation in the thickness direction, the annular cushioning projection projecting from the surface on the equilibrium chamber side of the rubber elastic plate preferentially comes into contact with the partition. By so doing, the initial contact area between the rubber elastic plate and the partition is made small, thereby reducing the striking noise. In particular, the projection height dimension of the annular cushioning projection is larger than that of the radial reinforcing rib, and the annular cushioning projection preferentially comes into contact with the partition, thereby reducing the striking noise due to the cushioning action of the annular cushioning projection.

A sixth preferred embodiment provides the fluid-filled vibration damping device according to any one of the first to fifth preferred embodiments, wherein the radial reinforcing rib extends linearly in a substantially radial direction of the rubber elastic plate.

According to the fluid-filled vibration damping device structured following the present preferred embodiment, the radial reinforcing rib extending linearly in the substantially radial direction of the rubber elastic plate efficiently exerts an influence on the deformation rigidity of the elastic deformation zone with respect to flexural (bending) deformation in the radial direction of the elastic deformation zone that is provided at the radially outer end of the rubber elastic plate. Therefore, by means of a fewer or smaller radial reinforcing rib, it is also possible to effectively tune the deformation characteristics of the elastic deformation zone while suppressing the influence on the minute pressure-fluctuation absorbing function of the rubber elastic plate.

A seventh preferred embodiment provides the fluid-filled vibration damping device according to any one of the first to sixth preferred embodiments, wherein the elastic deformation zone is provided with a protrusion projecting toward the pressure-receiving chamber side, the pressure-receiving chamber side of the protrusion is covered with a displacement-regulator part provided to the partition, and the radial reinforcing rib is provided at a position corresponding to the protrusion in a circumferential direction of the rubber elastic plate.

According to the fluid-filled vibration damping device structured following the present preferred embodiment, by the protrusion coming into contact with the displacement-regulator part of the partition, the amount of deformation of the elastic deformation zone toward the pressure-receiving chamber side is limited. As a result, the maximum opening area of the communication aperture is defined by the contact between the protrusion and the displacement-regulator part of the partition, thereby facilitating tuning of the influence of the fluid flow through the communication aperture on the vibration damping characteristics and the like.

For example, it is conceivable that the elastic deformation zone is likely to actively deform at the portion where the protrusion is formed. However, by providing the radial reinforcing rib at the position corresponding to the protrusion in the circumferential direction, the radial reinforcing rib can prevent excessive deformation or the like of the elastic deformation zone due to the formation of the protrusion, thereby making it possible to tune the mode of deformation of the elastic deformation zone or the like by means of the radial reinforcing rib.

An eighth preferred embodiment provides the fluid-filled vibration damping device according to the seventh preferred embodiment, wherein a projecting distal end face of the protrusion has a surface shape corresponding to that of the displacement-regulator part, and the projecting distal end face of the protrusion is provided with a radial cushioning projection extending in a radial direction of the rubber elastic plate.

According to the fluid-filled vibration damping device structured following the present preferred embodiment, the contact surfaces between the protrusion and the displacement-regulator part of the partition have shapes that approximately correspond to each other. Thus, the protrusion is readily held in a contact state with the displacement-regulator part with stability. Therefore, the state in which the elastic deformation zone deforms toward the pressure-receiving chamber side and the fluid flow through the communication aperture is allowed is stably maintained by the contact between the protrusion and the displacement-regulator part.

Besides, since the radial cushioning projection is provided on the projecting distal end face of the protrusion, the striking noise during the protrusion coming into contact with the displacement-regulator part of the partition is reduced by the cushioning action of the radial cushioning projection. In particular, for example, when the elastic deformation zone provided at the radially outer end of the rubber elastic plate deforms so as to flex in the radial direction, the radial cushioning projection extending approximately in the radial direction of the rubber elastic plate stably comes into contact with the displacement-regulator part. Accordingly, the effect of reducing the striking noise is stably exhibited by the radial cushioning projection.

A ninth preferred embodiment provides the fluid-filled vibration damping device according to the seventh or eighth preferred embodiment, wherein a deformation-regulator projection is provided on a radially inner side of the protrusion of the rubber elastic plate, the deformation-regulator projection being arranged side by side with the protrusion in a radial direction, and the radial reinforcing rib extends astride the protrusion and the deformation-regulator projection continuously in the radial direction, and extends to the radially inner side with respect to the deformation-regulator projection.

According to the fluid-filled vibration damping device structured following the present preferred embodiment, when the elastic deformation zone deforms toward the pressure-receiving chamber side, the deformation-regulator projection and the protrusion come into contact with the displacement-regulator part of the partition in a stepwise manner, thereby reducing the striking noise.

Additionally, the radial reinforcing rib extends continuously in the radial direction from the inside contact-retainer part to the protrusion beyond the deformation-regulator projection. Thus, even if the amount of deformation in the thickness direction increases in the portion where the protrusion and the deformation-regulator projection are formed, by adjusting the deformation rigidity of the elastic deformation zone by means of the radial reinforcing rib, the deformation characteristics of the elastic deformation zone can be tuned.

According to the present disclosure, it is possible to control the deformation of the rubber elastic plate with a large degree of freedom while suppressing the influence due to the deformation of the rubber elastic plate on the minute pressure-fluctuation absorbing function.

BRIEF DESCRIPTION OF THE DRAWINGS

The foregoing and/or other objects, features and advantages of the disclosure will become more apparent from the following description of practical embodiments with reference to the accompanying drawings in which like reference numerals designate like elements and wherein.

DETAILED DESCRIPTION

Hereinafter, practical embodiments of the present disclosure will be described in reference to the drawings.

Figure 1:
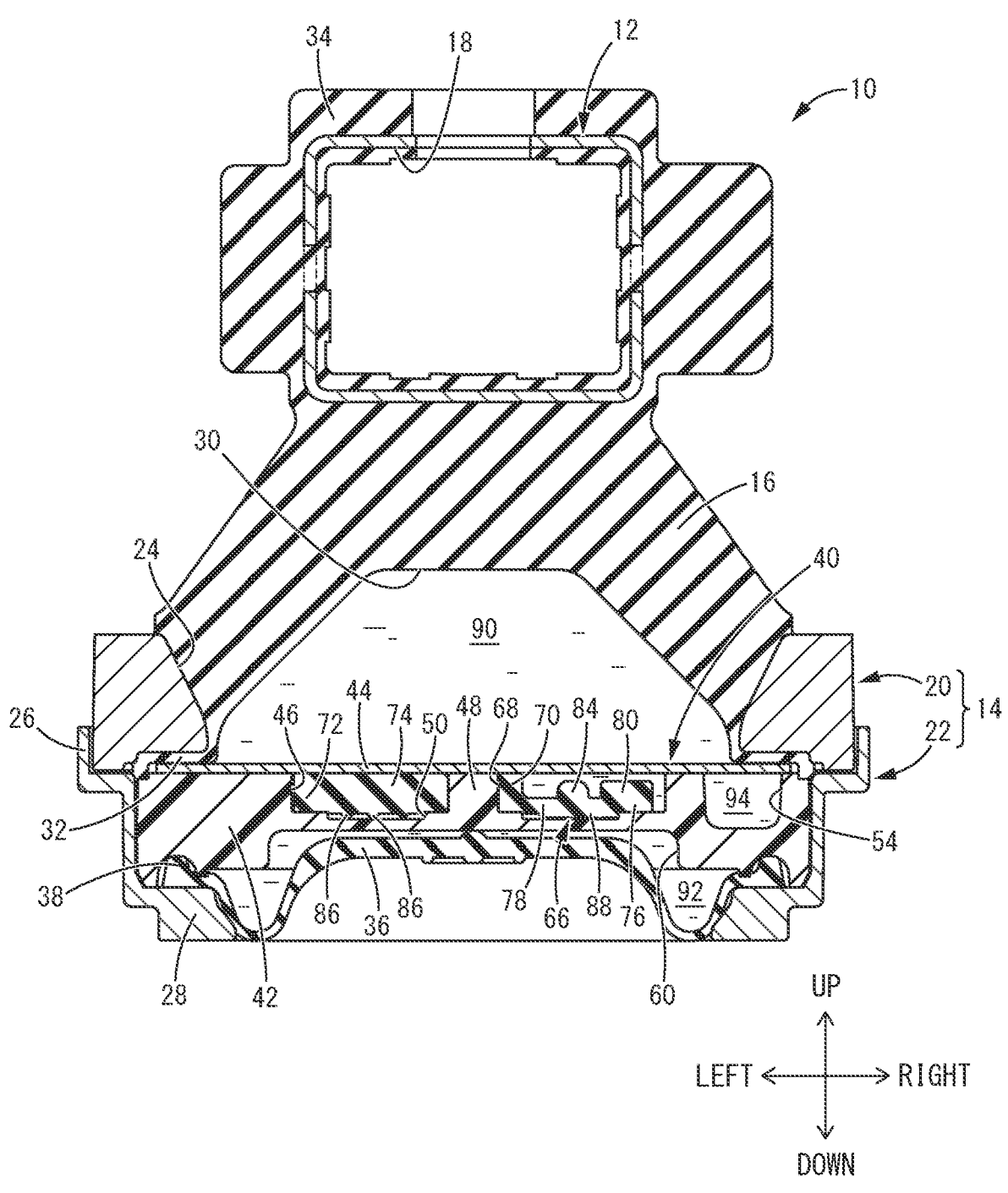
FIG. 1 is a cross sectional view showing a fluid-filled vibration damping device in the form of an engine mount as a first practical embodiment of the present disclosure, taken along line 1-1 of FIG. 3.
Figure 2:
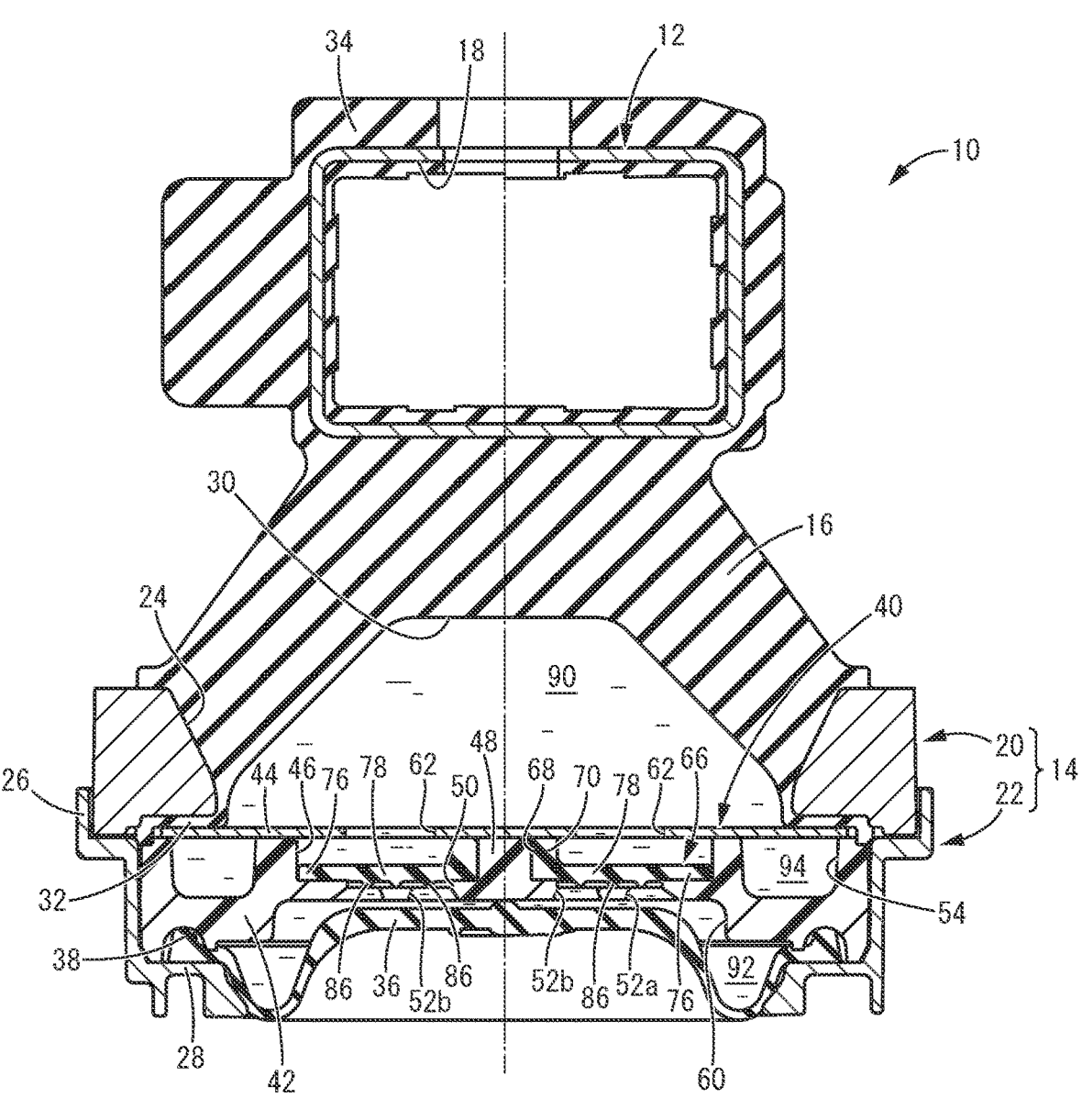
FIG. 2 is a cross sectional view of the engine mount shown in FIG. 1, taken along line 2-2 of FIG. 3.
Figure 3:
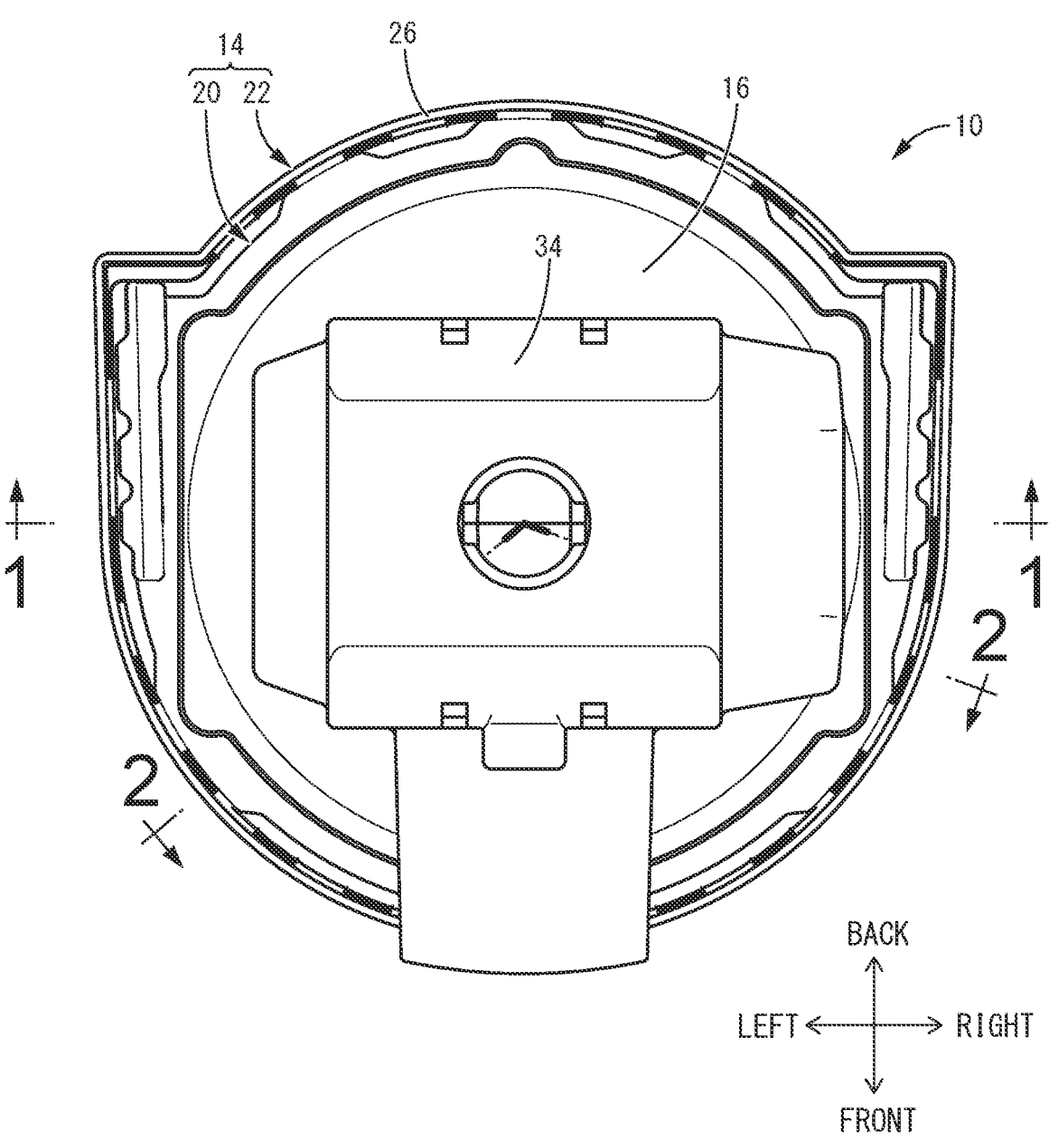
FIG. 3 is a top plan view of the engine mount shown in FIG. 1.

FIGS. 1 to 3 depict an automotive engine mount 10 as a first practical embodiment of a fluid-filled vibration damping device constructed according to the present disclosure. The engine mount 10 has a structure in which a first attachment member 12 and a second attachment member 14 are connected to each other by a main rubber elastic body 16. In the following description, as a general rule, the vertical direction refers to the vertical direction in FIG. 1, which is the main vibration input direction, the front-back direction refers to the vertical direction in FIG. 3, and the left-right direction refers to the left-right direction in FIG. 1. In addition, as a general rule, the circumferential direction refers to the circumferential direction around the mount center axis (the dot-and-dash line in FIG. 2).

Described more specifically, the first attachment member 12 has an approximately rectangular tube shape with an attachment hole 18 opening to the lateral side (in the front-back direction). The first attachment member 12 can be obtained by, for example, pressing a blank metal plate.

The second attachment member 14 is constituted by a fastening member 20 fastened to the main rubber elastic body 16 and a supporting member 22 attached to the fastening member 20 and extending downward. The fastening member 20 has a large-diameter annular shape extending in the circumferential direction with an approximately quadrangular cross-sectional shape, and its radially inner surface comprises a tapered receiving surface 24 whose diameter increases upward. The supporting member 22 has a tubular shape whose diameter decreases downward in a stepwise manner. The upper end portion of the supporting member 22 is provided with a positioning part 26 that is overlapped on the lower surface and the radially outer surface of the fastening member 20, while the lower end portion of the supporting member 22 is provided with an inner flange-shaped support part 28 that is opposed to the lower surface of the fastening member 20 in the vertical direction. By inserting the fastening member 20 into the positioning part 26 of the supporting member 22, the fastening member 20 and the supporting member 22 are mutually positioned so as to constitute the second attachment member 14. The fastening member 20 and the supporting member 22 may be connected to each other. As a specific example, the fastening member 20 and the supporting member 22 may be connected to each other by the fastening member 20 being fitted in the positioning part 26, or the fastening member 20 and the supporting member 22 may be connected to each other by being sandwiched by an outer bracket (not shown, described later) in the vertical direction.

The first attachment member 12 is disposed above the second attachment member 14 so as to be apart therefrom, and the first attachment member 12 and the second attachment member 14 are elastically connected to each other by the main rubber elastic body 16. The main rubber elastic body 16 has a thick, large-diameter, approximately frusto-conical shape, with its small-diameter side end bonded by vulcanization to the first attachment member 12, while its large-diameter side end bonded by vulcanization to the radially inner portion of the fastening member 20 of the second attachment member 14 having the tapered receiving surface 24. With this configuration, the main rubber elastic body 16 takes the form of an integrally vulcanization molded component including the first attachment member 12 and the fastening member 20.

A recess 30 is formed in the main rubber elastic body 16. The recess 30 has a shape of an inverted bowl, and opens onto the large-diameter end face of the main rubber elastic body 16. With this configuration, when viewed in vertical cross section, the main rubber elastic body 16 has an inclined shape extending downward so as to flare between the first attachment member 12 and the fastening member 20. On the radially outer side of the recess 30, a seal rubber layer 32 integrally formed with the main rubber elastic body 16 is fastened to the lower surface of the fastening member 20 of the second attachment member 14.

A covering rubber 34 is fastened to the first attachment member 12. The covering rubber 34 is fastened to the radially inner and outer surfaces and the front and back end surfaces of the first attachment member 12, and is integrally formed with the main rubber elastic body 16. The portions of the covering rubber 34, which are fastened to the upper outer surface and the left and right outer surfaces of the first attachment member 12, are thick-walled and protrude outward, and the said portions constitute a cushioning rubber for a stopper that limits an amount of relative displacement between the first attachment member 12 and the second attachment member 14.

A flexible film 36 is attached to the integrally vulcanization molded component of the main rubber elastic body 16. The flexible film 36 has a thin, large-diameter, approximately circular disk shape, and is flexible so as to easily undergo flexural deformation. The flexible film 36 is made thinner at the radially outer portion than at the radially inner portion so that the flexural deformation is more likely to occur. An annular positioning projection 38 projecting upward is integrally formed with the radially outer end of the flexible film 36. The flexible film 36 is configured such that the upper surface of its radially outer end is overlapped on the lower surface of the fastening member 20 via a partition 40 described later, while the lower surface of its radially outer end is overlapped on the upper surface of the support part 28 of the supporting member 22. The flexible film 36 is supported by its radially outer end being sandwiched by the second attachment member 14 in the vertical direction.

Figures 4, 5:
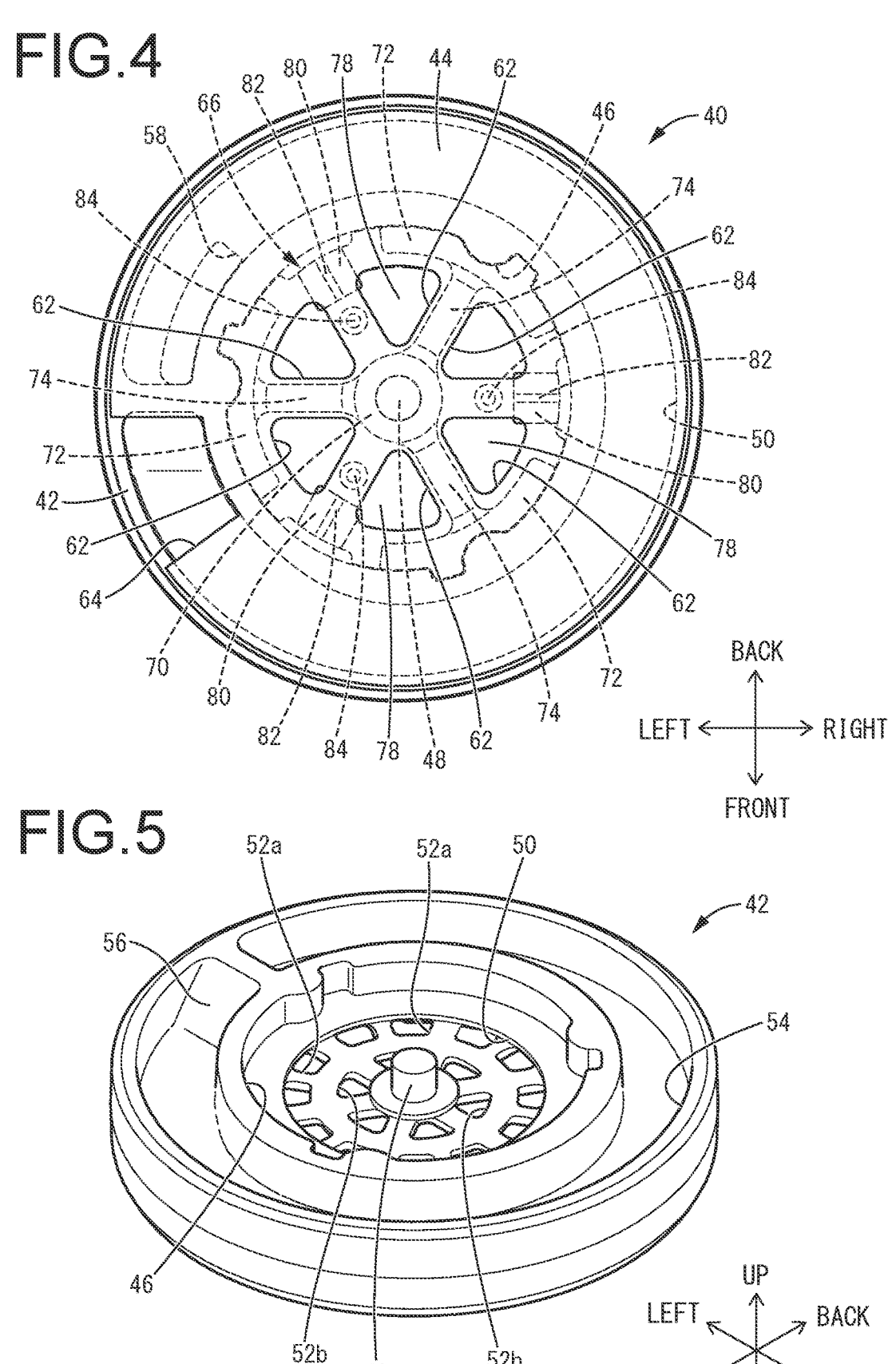
FIG. 4 is a top plan view of a partition constituting the engine mount shown in FIG. 1.
FIG. 5 is a perspective view of a partition main body constituting the engine mount shown in FIG. 1.

A partition 40 as shown in FIG. 4 is arranged between the integrally vulcanization molded component of the main rubber elastic body 16 and the flexible film 36. The partition 40 is constituted by a partition main body 42 and a lid member 44.

As shown in FIG. 5, the partition main body 42 has a generally circular disk shape overall. The partition main body 42 is a rigid member made of metal such as aluminum alloy or synthetic resin.

A housing recess 46 having an approximately circular shape is formed in the radially inner portion of the partition main body 42 so as to open onto the upper surface thereof. A support pin 48 projecting upward with an approximately circular post shape is integrally formed with the central portion of the bottom wall of the housing recess 46. An annular recess 50 that opens onto the upper surface of the bottom wall of the housing recess 46 is provided on the radially outer side of the support pin 48, and the depth dimension of the housing recess 46 is increased in the annular recess 50. A plurality of lower through holes 52a, 52b serving as communication apertures are formed so as to penetrate the bottom wall of the annular recess 50 in the vertical direction. The lower through holes 52a, 52b of the present practical embodiment are constituted by the plurality of lower through holes 52a arranged side by side in the circumferential direction at the radially outer end of the annular recess 50 and the plurality of lower through holes 52b arranged side by side in the circumferential direction on the radially inner side of the lower through holes 52a. The lower through hole 52a and the lower through hole 52b are different in shape from each other. Of course, the plurality of lower through holes 52a, 52b may be approximately uniform in shape and size, and the number and arrangement thereof are not particularly limited.

A circumferential groove 54 is formed in the radially outer portion of the partition main body 42 so as to open onto the upper surface thereof and extend in the circumferential direction. The circumferential groove 54 extends for a length less than once around the circumference in the circumferential direction, and includes a tapered part 56 at one end in the circumferential direction and a lower communication hole 58 at the other end in the circumferential direction that penetrates the bottom wall.

As shown in FIGS. 1 and 2, a circular lightening recess 60 having an approximately circular shape is formed in the radially inner portion of the partition main body 42 so as to open onto the lower surface. The lightening recess 60 has a diameter larger than that of the housing recess 46, and is provided on the radially inner side of the circumferential groove 54. The lower through hole 52a, 52b are provided so as to permit communication between the housing recess 46 and the lightening recess 60 in the axial direction.

The lid member 44 is made of metal or the like, and has an approximately circular disk shape that is thinner than the partition main body 42. Both the upper and lower surfaces of the lid member 44 are generally flat surfaces extending in the axis-perpendicular direction. As shown in FIG. 4, a plurality of upper through holes 62 are formed so as to penetrate the radially inner portion of the lid member 44 in the vertical direction. The upper through holes 62 of the present practical embodiment are different in shape, size, number and arrangement from the lower through holes 52a, 52b of the partition main body 42, but may be approximately the same in shape, size, number and arrangement as the lower through holes 52*a*, 52*b*. An upper communication hole 64 is formed so as to penetrate the radially outer portion of the lid member 44 in the vertical direction.

As shown in FIGS. 1 and 2, the lid member 44 is overlapped on and fixed to the upper surface of the partition main body 42. Whereas a method for fixing the lid member 44 to the partition main body 42 is not particularly limited, the lid member 44 can be fixed by means such as adhesion and welding, for example. It would also be possible to provide a fixing pin projecting upward to the partition main body 42 while providing a fixing hole corresponding to the fixing pin to the lid member 44, and to crush or melt to expand the distal end portion of the fixing pin passing through the fixing hole, so as to fix the lid member 44 and the partition main body 42.

With the partition main body 42 and the lid member 44 fixed to each other, the opening of the housing recess 46 of the partition main body 42 is covered and closed by the lid member 44. The upper through hole 62 of the lid member 44 is provided in the portion covering the opening of the housing recess 46, and the housing recess 46 is exposed upward through the upper through hole 62.

The opening of the circumferential groove 54 of the partition main body 42 is covered and closed by the lid member 44, so as to form a tunnel-like passage extending in the circumferential direction for a length just short of once around the circumference. One circumferential end of this tunnel-like passage opens upward through the upper communication hole 64 of the lid member 44, while the other circumferential end of this tunnel-like passage opens downward through the lower communication hole 58 of the partition main body 42.

A movable film 66 serving as a rubber elastic plate is arranged in the housing recess 46 of the partition main body 42. As shown in FIGS. 6 to 9, the movable film 66 has a generally circular disk shape overall. The movable film 66 is made of a rubber elastic body or a resin elastomer, and is allowed to undergo elastic deformation in the thickness direction.

A circular insertion hole 68 penetrates the diametrical center of the movable film 66 in the thickness direction. An inside contact-retainer part 70 having a round tubular shape is provided around the insertion hole 68 of the movable film 66 so as to project upward. At the radially outer edge of the movable film 66, three outside contact-retainer parts 72, 72, 72 are provided so as to extend in the circumferential direction while projecting upward. The outside contact-retainer parts 72 are arranged at a position away from the inside contact-retainer part 70 to the radially outer side. The three outside contact-retainer parts 72, 72, 72 are arranged at equal intervals in the circumferential direction and are apart from each other in the circumferential direction. Therefore, the outside contact-retainer part 72 is partially provided in the circumferential direction. A reinforcing connection part 74 is provided between the inside contact-retainer part 70 and each outside contact-retainer part 72 so as to extend in the radial direction of the movable film 66 and project upward. The reinforcing connection part 74 is connected to the approximate center in the circumferential direction of the outside contact-retainer part 72, and the outside contact-retainer part 72 extends from the reinforcing connection part 74 to the opposite sides in the circumferential direction. The reinforcing connection part 74 has an upward projection height smaller than those of the inside contact-retainer part 70 and the outside contact-retainer parts 72.

A relief part 76 serving as an elastic deformation zone is provided circumferentially between the outside contact-retainer parts 72, 72 that are adjacent in the circumferential direction. The relief part 76 is thinner than the outside contact-retainer parts 72, so as to easily deform in the thickness direction. Besides, a liquid-pressure absorbing part 78 having approximately the same thickness dimension as that of the relief part 76 is provided circumferentially between the reinforcing connection parts 74 that are adjacent in the circumferential direction.

A protrusion 80 is provided at the circumferentially central portion of the relief part 76. The protrusion 80 projects upward at the relief part 76 and has a generally flat upper surface that extends in the approximately axis-perpendicular direction. The protrusion 80 of the present practical embodiment has a rectangular parallelepiped shape. The protrusion 80 is spaced apart in the circumferential direction from the outside contact-retainer parts 72, 72 on the opposite sides of the relief part 76. By providing the protrusion 80, the relief part 76 is thick-walled at the circumferentially central portion, while being thin-walled at the circumferentially opposite sides. The protrusion 80 is supported by the thin-walled portion of the relief part 76 and the liquid-pressure absorbing part 78, and the thick-walled protrusion 80 is displaceable in the vertical direction due to deformation of the thin-walled relief part 76 and the liquid-pressure absorbing part 78. The movable film 66 has a smaller diameter at the circumferentially central portion of the relief part 76 where the protrusion 80 is provided than at the circumferentially opposite end portions of the relief part 76 that are adjacent to the outside contact-retainer parts 72. The radially inner end of the protrusion 80 is located on the radially inner side of the radially inner end of the outside contact-retainer part 72, and the radial dimension of the protrusion 80 is larger than that of the circumferential end of the outside contact-retainer part 72. The upward projection height of the protrusion 80 is lower than those of the inside contact-retainer part 70 and the outside contact-retainer part 72. The maximum opening area of a relief passage of the relief part 76 is set by the distance (the clearance) between the upper surface of the protrusion 80 and the lower surface of the lid member 44.

Figure 6:
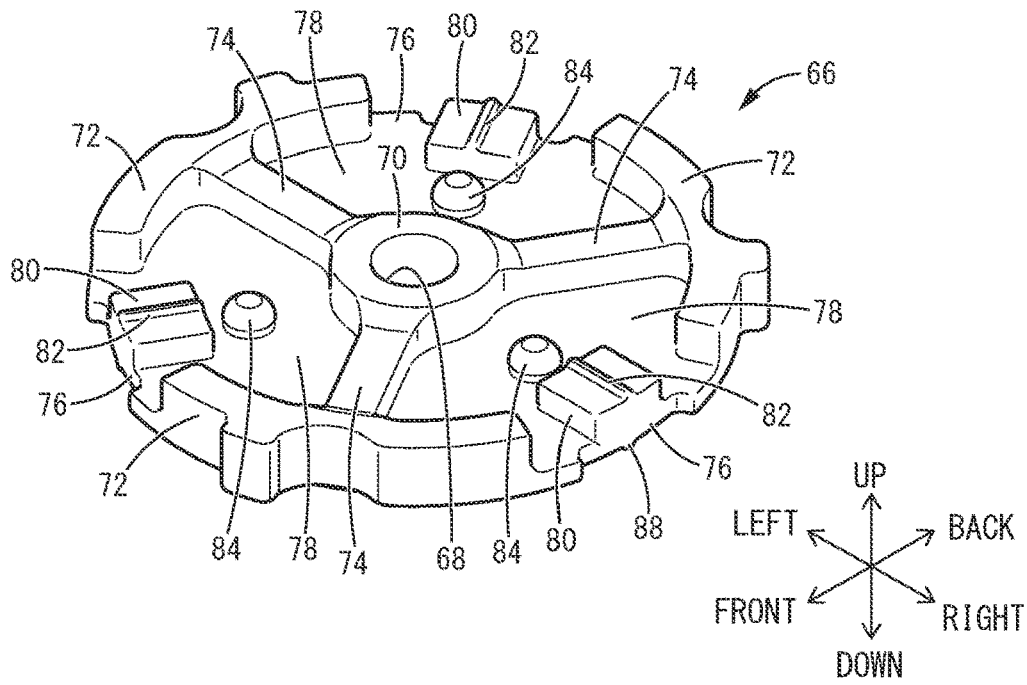
FIG. 6 is a perspective view of a movable film constituting the engine mount shown in FIG. 1.
Figure 8:
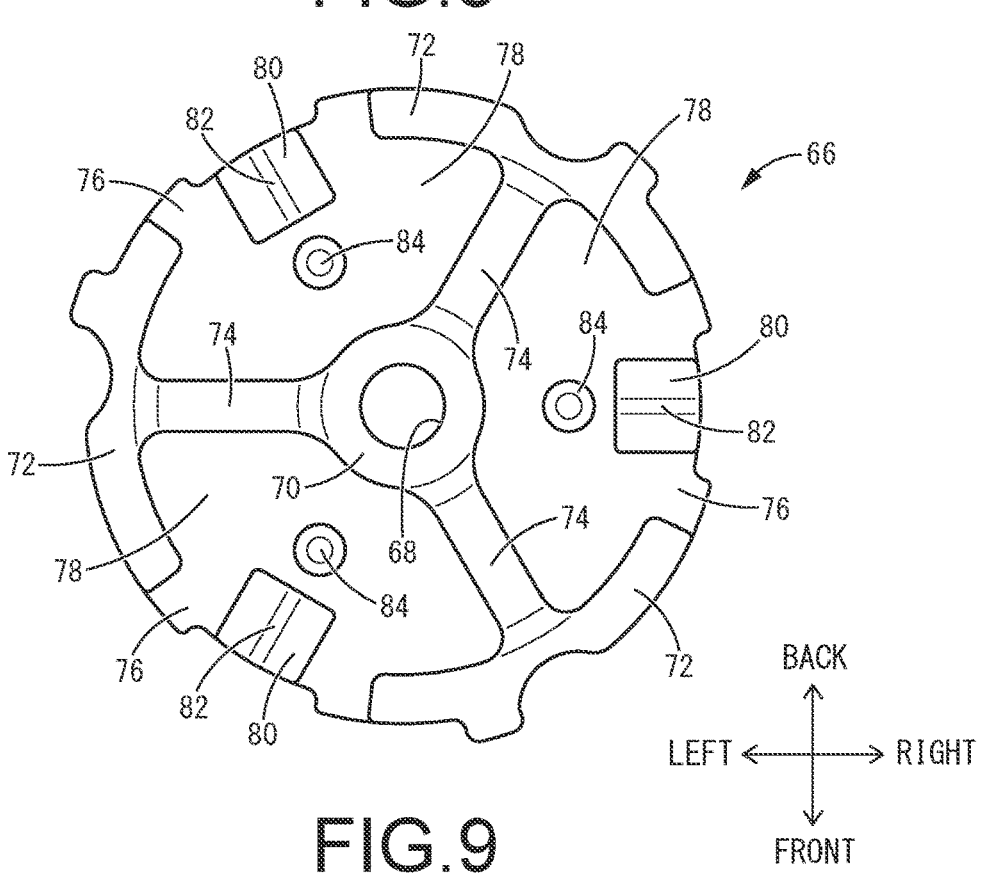
FIG. 8 is a top plan view of the movable film shown in FIG. 6.

A radial cushioning projection 82 is provided so as to project from the upper surface of the protrusion 80. As shown in FIGS. 6 and 8, the radial cushioning projection 82 extends linearly and continuously in the radial direction. The projection height dimension of the radial cushioning projection 82 is smaller than that of the protrusion 80, and is, for example, 1/5 or smaller than the projection height dimension of the protrusion 80. The width dimension of the radial cushioning projection 82 in the circumferential direction of the movable film 66 is smaller than the width dimension of the protrusion 80, and is, for example, 1/3 or smaller than the width dimension of the protrusion 80. The radial cushioning projection 82 preferably has a tapered shape whose width dimension decreases upward.

A deformation-regulator projection 84 projecting upward is provided on the radially inner side of the protrusion 80 of the movable film 66. The deformation-regulator projection 84 is arranged side by side with the protrusion 80 in the radial direction, and is provided radially between the inside contact-retainer part 70 and the protrusion 80 so as to be apart from both of them. The deformation-regulator projection 84 is provided on the liquid-pressure absorbing part 78 of the movable film 66, and is arranged in the circumferential center of the liquid-pressure absorbing part 78 where the amount of deformation of the liquid-pressure absorbing part 78 is likely to be large. The deformation-regulator projection 84 is preferably arranged in the radial center of the liquid-pressure absorbing part 78 and the relief part 76 that are allowed to undergo deformation and/or displacement. In the present practical embodiment, the deformation-regulator projection 84 is arranged at a position closer to the protrusion 80 than the inside contact-retainer part 70 in the radial direction. The deformation-regulator projection 84 preferably has a tapered shape at least at the distal end portion that decreases in diameter toward the projecting distal end. In the present practical embodiment, the proximal end portion of the deformation-regulator projection 84 has a circular post shape, while the distal end portion thereof has a shape of an approximately spherical trapezoid that tapers upward.

Figure 7:
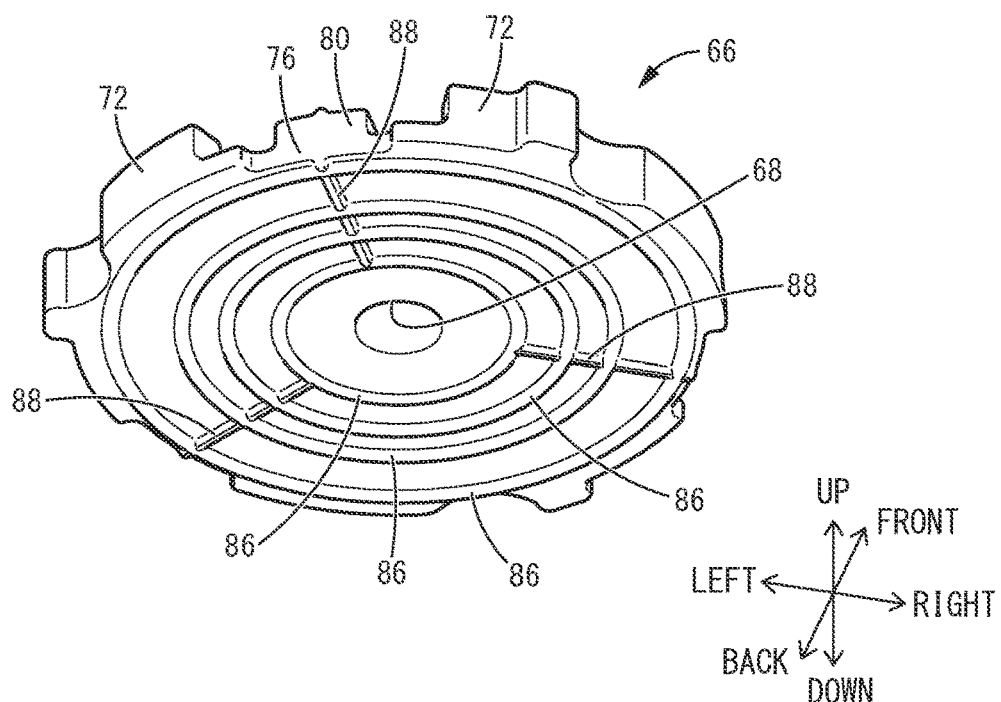
FIG. 7 is a perspective view of the movable film shown in FIG. 6 at another angle.
Figure 9:
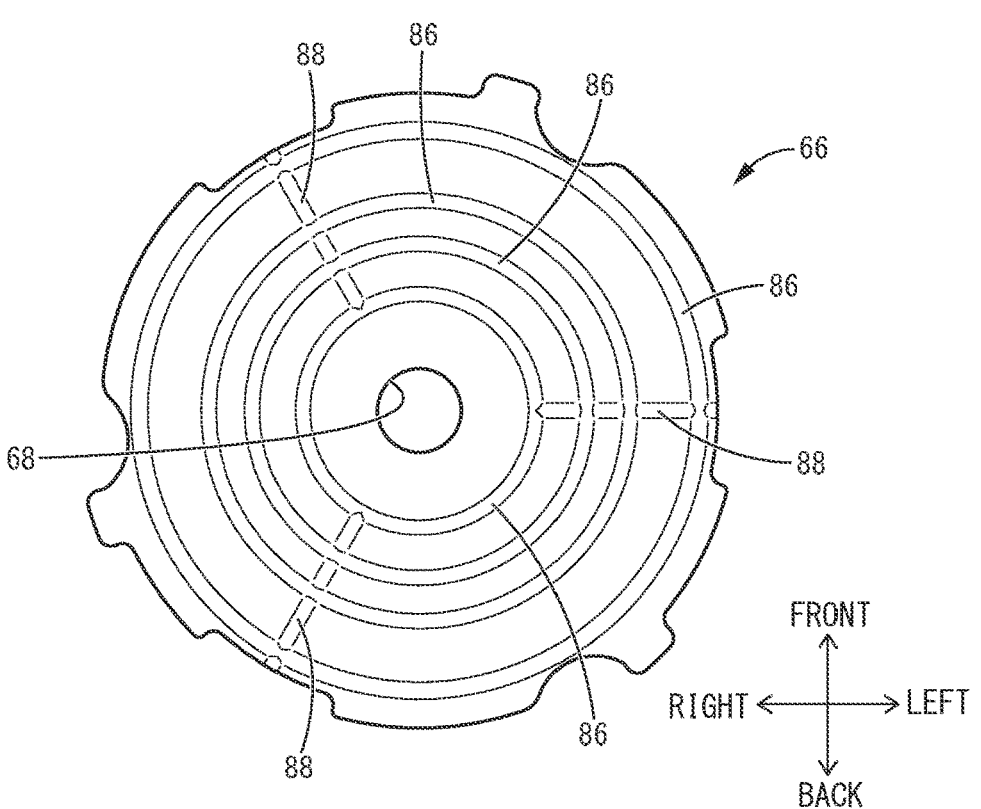
FIG. 9 is a bottom plan view of the movable film shown in FIG. 6.
Figure 10:
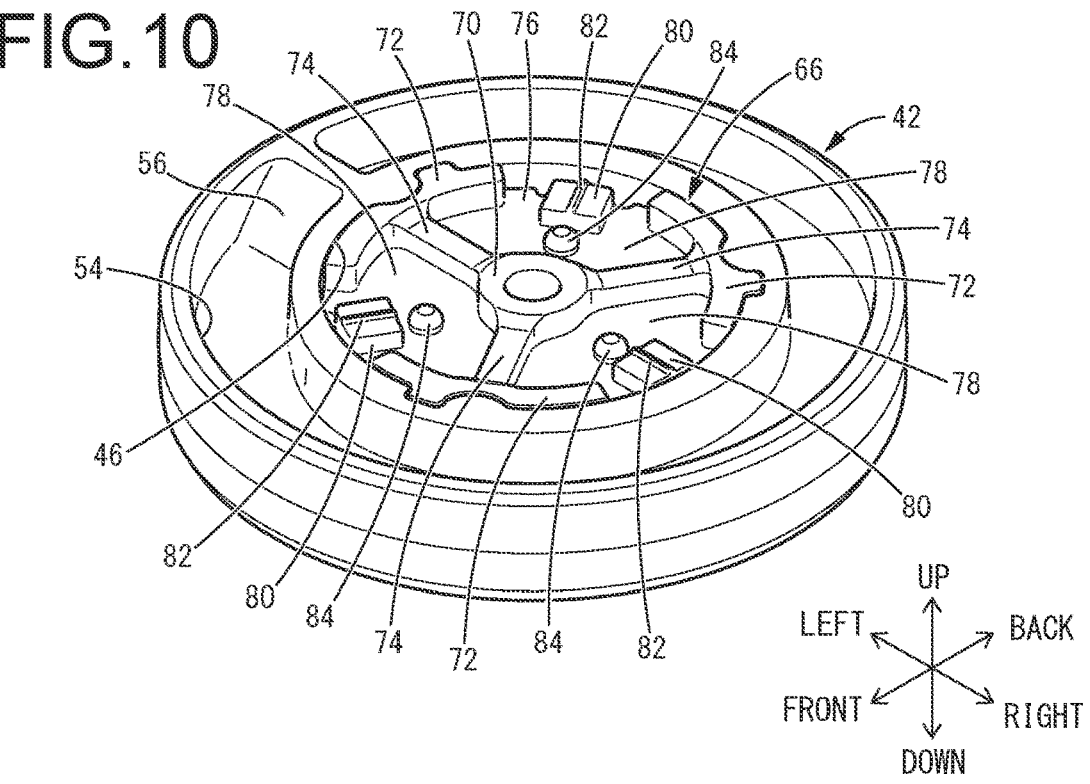
FIG. 10 is a perspective view of the movable film shown in FIG. 6 attached to the partition main body shown in FIG. 5.
Figure 11:
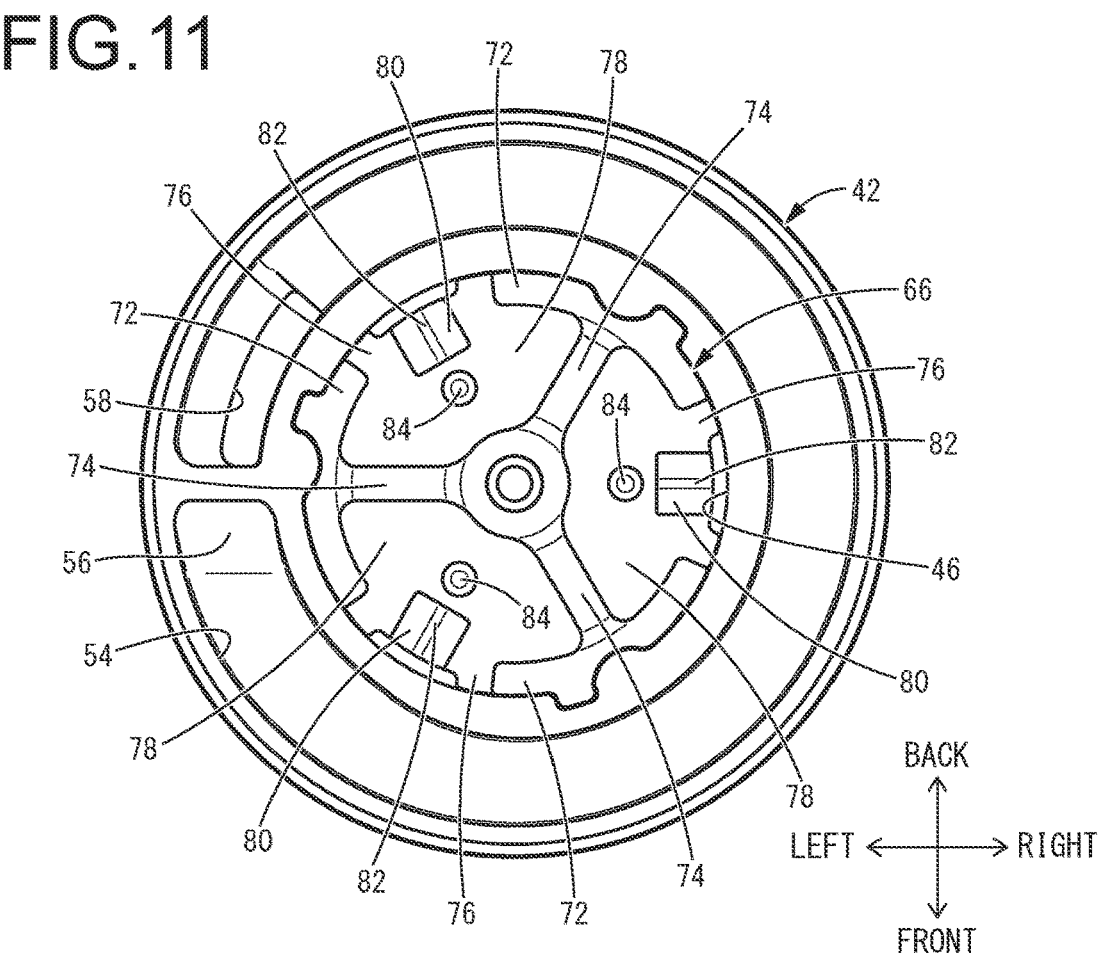
FIG. 11 is a top plan view of the movable film attached to the partition main body shown in FIG. 10.

As shown in FIGS. 7 and 9, a plurality of annular cushioning projections 86 extending in the circumferential direction are provided so as to project from the lower surface of the movable film 66. The annular cushioning projections 86 extend continuously about the entire circumference and project downward. The annular cushioning projections 86 have a tapered cross-sectional shape whose width dimension decreases toward the projecting distal end, and have an approximately hemispherical cross-sectional shape in the present practical embodiment. The plurality of annular cushioning projections 86 having mutually different diameters are provided in a concentric fashion, and in the present practical embodiment, four annular cushioning projections 86, 86, 86, 86 are provided at positions apart from each other in the radial direction. The annular cushioning projections 86 are provided on the radially outer side of the inside contact-retainer part 70. The annular cushioning projection 86 that is located at the outermost circumference is provided on the lower surface of the relief part 76, and the other annular cushioning projections 86 are provided on the lower surface of the liquid-pressure absorbing part 78. The projection height dimension of the annular cushioning projection 86 is, for example, 1/5 or smaller than the thickness dimension of the radially inner end of the movable film 66 where the inside contact-retainer part 70 is provided. The radial width dimension of the annular cushioning projection 86 is smaller than that of the inside contact-retainer part 70, and is, for example, 1/3 or smaller than the radial width dimension of the inside contact-retainer part 70.

A plurality of radial reinforcing ribs 88 project from the lower surface of the movable film 66 and extend in the radial direction. The radial reinforcing ribs 88 linearly extend in the radial direction and project downward. The radial reinforcing ribs 88 have a tapered cross-sectional shape whose width dimension decreases toward the projecting distal end, and in the present practical embodiment, extend in the radial direction with an approximately hemispherical cross-sectional shape. It is desirable that the radial reinforcing ribs 88 have a downward projection height dimension smaller than that of the annular cushioning projection 86. The radial reinforcing ribs 88 preferably have a width dimension that is approximately equal to or slightly smaller than that of the annular cushioning projection 86. The radial reinforcing ribs 88 extend radially outward from the inside contact-retainer part 70 toward the respective relief parts 76, while being provided on the radially outer side of the innermost annular cushioning projection 86, and extend to the radially outer end of the movable film 66. The radial reinforcing ribs 88 intersect each of the plurality of annular cushioning projections 86, and are integrated with the annular cushioning projections 86 at their intersections, while extending radially between the plurality of annular cushioning projections 86.

The radial reinforcing ribs 88 are provided at portions corresponding to the relief parts 76 in the circumferential direction of the movable film 66, and in the present practical embodiment, each radial reinforcing rib 88 is positioned at the circumferential center of the corresponding relief part 76. In the present practical embodiment, one radial reinforcing rib 88 is provided for one relief part 76, and three radial reinforcing ribs 88, 88, 88 are provided. The three radial reinforcing ribs 88, 88, 88 are arranged at approximately equal intervals in the circumferential direction. In the circumferential direction of the movable film 66, each radial reinforcing rib 88 is positioned corresponding to the protrusion 80 projecting from the upper surface of the relief part 76 and the deformation-regulator projection 84 so as to be at the approximate center. The radial reinforcing rib 88 extends astride the protrusion 80 and the deformation-regulator projection 84 in the radial direction, and extends to the radially inner side with respect to the deformation-regulator projection 84.

The movable film 66 having such a structure is inserted in the housing recess 46 of the partition main body 42. The movable film 66 is radially positioned with respect to the partition main body 42 by the support pin 48 of the partition main body 42 being inserted into the insertion hole 68 while the radially outer surface of the movable film 66 being overlapped with the radially inner surface of the housing recess 46 of the partition main body 42. The radially outer surface of the movable film 66 and the circumferential wall inner surface of the housing recess 46 are provided with concave and convex portions corresponding to each other. Those concave and convex portions limit rotation of the movable film 66 in the circumferential direction, so that the movable film 66 is positioned with respect to the partition main body 42 in the circumferential direction. The movable film 66 is arranged in the housing recess 46 such that the lower through holes 52a, 52b are covered from above. The outside diameter dimension of the movable film 66 is smaller than the inside diameter dimension of the housing recess 46, and the radially outer surface of the movable film 66 is located on the radial inside of the radially inner surface of the housing recess 46.

By the lid member 44 being attached to the partition main body 42, the inside contact-retainer part 70 and the outside contact-retainer parts 72 of the movable film 66 are axially sandwiched between the bottom wall inner surface of the of the housing recess 46 and the lid member 44. The movable film 66 is held in an overlapped state of being in contact with the bottom wall of the housing recess 46 at the inside contact-retainer part 70 and the outside contact-retainer parts 72. The relief part 76 and the liquid-pressure absorbing part 78 of the movable film 66 are apart downward from the lid member 44 and are allowed to deform upward in the thickness direction.

The movable film 66 is arranged such that the upper side of the protrusion 80 is covered with the lid member 44 serving as a displacement-regulator part. The protrusion 80 is arranged such that the radially outer portion is disposed on the radially outer side of the upper through hole 62, while at least the circumferentially central portion where the radial cushioning projection 82 is provided is located circumferentially between the upper through holes 62, 62 that are adjacent in the circumferential direction. Accordingly, the protrusion 80 is covered with the lid member 44 so as to be hardly exposed from the upper through hole 62. Besides, the movable film 66 is arranged such that the upper side of the deformation-regulator projection 84 is covered with the lid member 44. The deformation-regulator projection 84 is located circumferentially between the upper through holes 62, 62 that are adjacent in the circumferential direction, and is covered with the lid member 44 without being exposed from the upper through hole 62. The lower surface of the lid member 44 comprises a flat surface extending in the approximately axis-perpendicular direction in its entirety, and extends approximately parallel to the upper surface of the protrusion 80 and the upper surface of the deformation-regulator projection 84 that are both flat surfaces.

The partition 40 housing the movable film 66 inside is arranged axially between the main rubber elastic body 16 and the flexible film 36, and its radially outer end is attached to the second attachment member 14. That is, the radially outer end of the partition 40 is inserted between the axially opposed faces of the fastening member 20 and the support part 28 of the supporting member 22 in the second attachment member 14, and is clasped by the fastening member 20 and the supporting member 22.

The seal rubber layer 32 integrally formed with the main rubber elastic body 16 is sandwiched between the fastening member 20 and the partition 40, so as to provide a liquid-tight sealing between the overlapped surfaces of the fastening member 20 and the partition 40. In addition, the radially outer end of the flexible film 36 is arranged between the radially outer end of the partition 40 and the support part 28 of the supporting member 22 so that the radially outer end of the flexible film 36 is clasped between the partition 40 and the supporting member 22, thereby providing a liquid-tight sealing between the overlapped surfaces of the support part 28 of the supporting member 22 and the partition 40.

Between the main rubber elastic body 16 and the partition 40, there is formed a pressure-receiving chamber 90 whose wall part is partly constituted by the main rubber elastic body 16 and which gives rise to internal pressure fluctuations due to elastic deformation of the main rubber elastic body 16. Additionally, between the partition 40 and the flexible film 36, there is formed an equilibrium chamber 92 whose wall part is partly constituted by the flexible film 36, and in which the internal pressure is kept approximately constant due to volume changes caused by deformation of the flexible film 36. The pressure-receiving chamber 90 and the equilibrium chamber 92 are filled with a non-compressible liquid such as water, ethylene glycol, alkylene glycol, polyalkylene glycol, silicone oil, and a mixture of these. The fluid sealed in the pressure-receiving chamber 90 and the equilibrium chamber 92 is preferably a low-viscosity fluid of 0.1 Pa· s or lower.

The pressure-receiving chamber 90 and the equilibrium chamber 92 communicate with each other through an orifice passage 94. The orifice passage 94 is constituted by the circumferential groove 54 and the upper and lower communication holes 64, 58, with one end opening to the pressure-receiving chamber 90 while the other end opening to the equilibrium chamber 92. In the orifice passage 94, the resonance frequency of the flowing fluid, which is the tuning frequency, is tuned to the frequency of vibration to be damped by adjusting the ratio of the passage cross-sectional area to the passage length while considering the wall spring rigidity of the pressure-receiving chamber 90. For example, the orifice passage 94 is tuned to a low frequency of around several Hz corresponding to engine shake.

The housing recess 46 of the partition 40 communicates with the pressure-receiving chamber 90 through the upper through hole 62 of the lid member 44, while communicating with the equilibrium chamber 92 through the lower through holes 52a, 52b of the partition main body 42. In other words, the pressure-receiving chamber 90 and the equilibrium chamber 92 communicate with each other through the passage including the lower through holes 52a, 52b. With this configuration, the liquid pressure of the pressure-receiving chamber 90 is exerted on the upper surface of the movable film 66 arranged in the housing recess 46, while the liquid pressure of the equilibrium chamber 92 is exerted on the lower surface of the movable film 66. When relative pressure fluctuations arise between the pressure-receiving chamber 90 and the equilibrium chamber 92, the liquid-pressure absorbing part 78 of the movable film 66 deforms in the thickness direction based on the pressure fluctuations, and a substantial fluid flow occurs between the pressure-receiving chamber 90 and the equilibrium chamber 92. In the liquid-pressure absorbing part 78, the tuning frequency at which deformation in the thickness direction actively occurs in a resonant state is set to a higher frequency than the tuning frequency of the orifice passage 94. For example, the tuning frequency of the liquid-pressure absorbing part 78 is tuned to a medium frequency of around ten or more Hz corresponding to idling vibration, or a high frequency of around several tens of Hz corresponding to booming noise.

The engine mount 10 having such a structure is configured such that an inner bracket (not shown) is inserted into the first attachment member 12, and the first attachment member 12 is attached to a power unit side (not shown) via the inner bracket. Besides, the engine mount 10 is configured such that an outer bracket (not shown) is attached to the radially outer surface of the second attachment member 14, and the second attachment member 14 is attached to a vehicle body side (not shown) via the outer bracket. With these arrangements, the engine mount 10 is interposed between the power unit side and the vehicle body side, and connects the power unit side and the vehicle body side to each other in a vibration damping manner.

With the engine mount 10 mounted on the vehicle, when a low-frequency, large-amplitude vibration corresponding to engine shake is input across the first attachment member 12 and the second attachment member 14, a fluid flow through the orifice passage 94 actively occurs in a resonant state due to relative pressure fluctuations between the pressure-receiving chamber 90 and the equilibrium chamber 92. By so doing, vibration damping effect (high attenuating effect) based on flow action of the fluid is exhibited, thereby reducing vibration energy.

When a low-frequency, large-amplitude vibration is input, regarding the liquid-pressure absorbing part 78 of the movable film 66, deformation in the thickness direction cannot follow the input vibration, and transmission action of the liquid pressure due to the deformation is not effectively exhibited. Therefore, the internal pressure fluctuations of the pressure-receiving chamber 90 are reliably obtained without being reduced by the liquid-pressure absorbing action of the movable film 66, and a fluid flow through the orifice passage 94 efficiently occurs, whereby vibration damping effect is excellently exhibited by the orifice passage 94.

When a vibration of higher frequency than the tuning frequency is input, the orifice passage 94 is substantially clogged due to antiresonance. Therefore, when a medium-to high-frequency, small-amplitude vibration corresponding to idling vibration or booming noise is input across the first attachment member 12 and the second attachment member 14, no action is exhibited to transmit the internal pressure of the pressure-receiving chamber 90 to the equilibrium chamber 92 due to the fluid flow through the orifice passage 94.

Therefore, when a medium-to high-frequency, small-amplitude vibration is input, the liquid-pressure absorbing part 78 of the movable film 66 undergoes minute deformation in the thickness direction following the input vibration, so that a substantial fluid flow occurs between the pressure-receiving chamber 90 and the equilibrium chamber 92, thereby transmitting the internal pressure fluctuations in the pressure-receiving chamber 90 to the equilibrium chamber 92. By so doing, vibration damping effect (vibration isolation effect due to low dynamic spring behavior) based on a minute pressure-fluctuation absorbing function of the movable film 66 is exhibited, thereby reducing vibration transmission to the vehicle body side, which is the member to be vibration-damped.

Meanwhile, when the internal pressure of the pressure-receiving chamber 90 suddenly and considerably drops due to the input of a large load, gas phase separation may occur in the pressure-receiving chamber 90. The impact noise during burst of the grown bubbles can be a problem as a cavitation noise.

Figure 12:
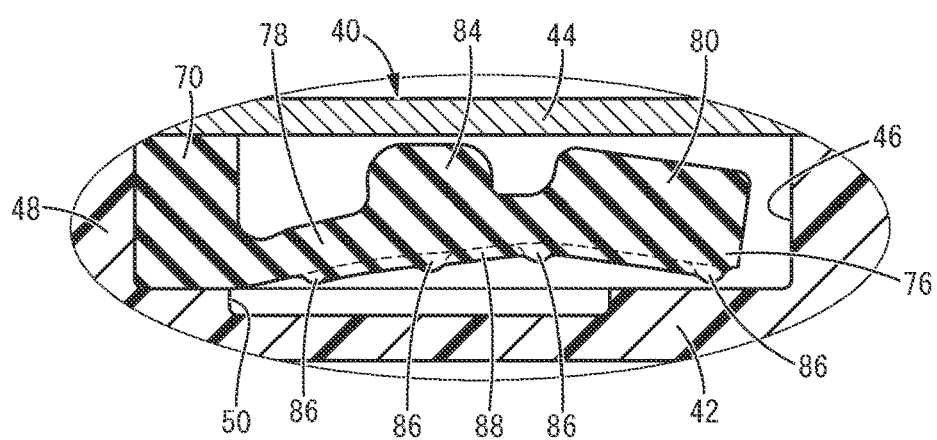
FIG. 12 is a view suitable for explaining deformation of the movable film in the engine mount shown in FIG. 1.

Therefore, in the engine mount 10, the relief part 76 provided on the movable film 66 is configured to reduce the cavitation noise. Specifically, when the internal pressure of the pressure-receiving chamber 90 considerably drops to the extent that cavitation becomes a problem, the relief part 76 provided at the radially outer end of the movable film 66 is suctioned by negative pressure toward the pressure-receiving chamber 90 side. Then, as shown in FIG. 12, the relief part 76 becomes apart upward from the bottom wall inner surface of the housing recess 46. Accordingly, the lower through holes 52a, 52b are opened into the housing recess 46, and the pressure-receiving chamber 90 and the equilibrium chamber 92 communicate with each other through the relief passage formed by the lower through holes 52a, 52b, the housing recess 46, and the upper through hole 62 without interposing the movable film 66. By so doing, the fluid flows from the equilibrium chamber 92 into the pressure-receiving chamber 90 through the relief passage, thereby quickly reducing or eliminating the drop in the internal pressure of the pressure-receiving chamber 90.

In the present practical embodiment, the relief part 76 is provided with the protrusion 80. In a state where the relief part 76 is apart upward from the bottom wall inner surface of the housing recess 46 to form the relief passage, the protrusion 80 comes into contact with the lid member 44 serving as the displacement-regulator part. By so doing, the amount of upward deformation (displacement) of the relief part 76 is regulated by the protrusion 80, and the passage cross-sectional area of the relief passage in the relief part 76 is set to an appropriate size. Besides, since the upper surface of the protrusion 80 has a flat shape corresponding to the lower surface of the lid member 44, the contact state between the upper surface of the protrusion 80 and the lower surface of the lid member 44 is stable, and the relief part 76 is stably held positioned.

Since the radial cushioning projection 82 is provided on the upper surface of the protrusion 80, when the protrusion 80 comes into contact with the lid member 44, the radial cushioning projection 82 preferentially comes into contact with the lid member 44. With this arrangement, the initial contact area between the protrusion 80 and the lid member 44 is made small by the radial cushioning projection 82, whereby reduction in striking noise can be achieved by the cushioning action of the radial cushioning projections 82. Moreover, since the radial cushioning projection 82 extends in the radial direction, as shown in FIG. 12, even in the case where the upper surface of the protrusion 80 comes into contact with the lower surface of the lid member 44 in a state of being vertically inclined in the radial direction, the radial cushioning projection 82 preferentially comes into contact with the lid member 44 in a stable manner. In particular, in the case where the inclination angle of the protrusion 80 with respect to the lid member 44 decreases after the contact of the radial cushioning projection 82 with the lid member 44, the range of contact of the radial cushioning projection 82 with the lid member 44 gradually increases in the length direction (the radial direction). Thus, occurrence of the striking noise due to a sudden increase in contact area is more effectively prevented.

The magnitude of the negative pressure in the pressure-receiving chamber 90 during the opening action, in which the relief part 76 becomes apart from the bottom wall inner surface of the housing recess 46 to open the lower through holes 52a, 52b, is set mainly based on the deformation rigidity of the portion of the relief part 76 away from the protrusion 80 and the deformation rigidity of the liquid-pressure absorbing part 78 located on the radially inner side of the relief part 76. In particular, as can be understood from FIG. 12, the approximately central portion of the liquid-pressure absorbing part 78, which is subjected to a liquid-pressure differential exerted on the upper and lower surfaces thereof and in which deformation is induced, undergoes elastic deformation so as to be lifted upward. Following the elastic deformation, the relief part 76 provided on the radially outer portion of the movable film 66 deforms and moves upward in such a way that the upward elastic deformation of the approximately central portion of the liquid-pressure absorbing part 78 is transmitted toward the outer periphery in the radial direction. By so doing, the two chambers 90, 92 are placed in a short-circuited communicating state, thereby effectively reducing the cavitation noise. Here, in the present practical embodiment, the radial reinforcing rib 88 is provided along the transmission path of the elastic deformation or stress from the approximately central portion of the liquid-pressure absorbing part 78 toward the relief part 76. This makes it possible to tune the transmission characteristics of the elastic deformation or stress from the approximately central portion of the radial reinforcing ribs 88 toward the relief part 76 by adjusting the size, shape, and the like of the radial reinforcing rib 88. Specifically, for example, by forming the radial reinforcing ribs 88 with a sufficiently large cross-sectional shape, the relief part 76 is able to more efficiently perform the relief action based on the liquid pressure acting on the liquid-pressure absorbing part 78. On the other hand, the setting area of the radial reinforcing rib 88 is a limited partial area with respect to the entire liquid-pressure absorbing surface acting as a movable film in the liquid-pressure absorbing part 78, and in particular, extends for just a short length from the relief part 76 toward the radially inner side. That is, the radial reinforcing rib 88 only extends in the radial direction from the central portion of the liquid-pressure absorbing part 78 toward the relief part 76, and does not extend in other directions such as the circumferential direction. Therefore, in the liquid-pressure absorbing part 78, it is possible to obtain a sufficient area zone for exhibiting a minute liquid-pressure fluctuation absorbing action with respect to a small-amplitude vibration, and such a liquid-pressure fluctuation absorbing action can be effectively exhibited without being adversely affected by the existence of the radial reinforcing rib 88.

That is, the movable film 66 is provided with the radial reinforcing rib 88 extending radially outward from the inside contact-retainer part 70 toward the relief part 76. By the deformation rigidity being adjusted by the radial reinforcing rib 88, it is possible to set a threshold for opening action of the relief part 76 described above. Therefore, for example, when an engine shake for which the orifice passage 94 is tuned is input, the lower through holes 52*a*, 52*b* are kept closed by the relief part 76. This prevents escape of the liquid pressure through the lower through holes 52*a*, 52*b* (reduction or elimination of pressure differential arising between pressure-receiving chamber 90 and the equilibrium chamber 92), thereby effectively exhibiting the vibration damping effect due to the orifice passage 94. Furthermore, when the pressure in the pressure-receiving chamber 90 drops, which causes the problem of occurrence of cavitation, the relief part 76 opens with sufficient accuracy, and the negative pressure in the pressure-receiving chamber 90 is quickly reduced or dispelled.

On the other hand, in the present practical embodiment, since the protrusion 80 is formed in the relief part 76 to increase the mass, and/or the free length of the relief part 76 in the circumferential direction is adjusted by the outside contact-retainer part 72 so as to be shorter than the free length of the radially middle portion of the liquid-pressure absorbing part 78 in the circumferential direction, unnecessary relief action of the relief part 76 is suppressed. That is, it is possible to reliably exhibit the relief action by efficiently transmitting the elastic deformation of the liquid-pressure absorbing part 78 to the relief part 76 by means of the radial reinforcing rib 88 as described above, while suppressing unnecessary relief action caused by the relief part 76 being easily or unstably moved by small pressure fluctuations. As a result, in addition to effectively obtaining the sufficient amount of fluid flow through the orifice passage 94 during input of a vibration to be damped and achieving low dynamic spring characteristics due to the liquid-pressure absorbing action based on the elastic deformation of the liquid-pressure absorbing part 78 during input of a small-amplitude vibration, it is possible to reliably operate the relief mechanism by the relief part 76 during input of an excessive impact load thereby obtaining prevention effect of the cavitation noise. Besides, in the present practical embodiment in particular, the amount of displacement of the relief part 76 during the relief action is limited by the protrusion 80, which is formed so as to project upward, coming into contact with the lid member 44. This makes it also possible to prevent excessive relief action due to unnecessary large displacement of the relief part 76.

Indeed, it is also possible to some extent to adjust the amount of upward deformation of the movable film 66 with respect to the magnitude of the negative pressure in the pressure-receiving chamber 90 by means of the radial reinforcing rib 88. The movable film 66 undergoes deformation so as to flex in an arcuate shape as shown in FIG. 12 with respect to the action of the negative pressure in the pressure-receiving chamber 90. Thus, by controlling the said arcuate-shaped flexural deformation (the deformation characteristics of only the circumferentially central portion of the liquid-pressure absorbing part 78) by means of the radial reinforcing rib 88 extending in the radial direction, it is possible to efficiently adjust the amount of relief. That is, by means of the radial reinforcing rib 88 extending in the radial direction, regarding the circumferentially central portion of the liquid-pressure absorbing part 78 of the movable film 66, it is also possible to control the arcuate-shaped flexural deformation of the movable film 66 and the like (for example, to suppress excessive deformation of the central portion of the liquid-pressure absorbing part 78 and the like) by the radial reinforcing rib 88 by utilizing the action with respect to the vertically flexural deformation rigidity in the radial direction.

Additionally, by adjusting the deformation rigidity of the movable film 66 by means of the radial reinforcing ribs 88, it is possible to adjust and set the displacement speed of the relief part 76 when opening and closing the lower through holes 52*a*, 52*b* due to deformation. This makes it possible to adjust the strength (the momentum) of strike of the relief part 76 against the wall inner surface of the housing recess 46.

Since the radial reinforcing rib 88 projects from the lower surface of the movable film 66, when the relief part 76 undergoes arcuate-shaped flexural deformation during the opening action, the radial reinforcing rib 88 is subjected to compression force in the direction of extension (the radial direction). Therefore, the deformation characteristics (such as deformation rigidity) of the relief part 76 during the opening action can be efficiently adjusted by the lengthwise compression spring of the radial reinforcing rib 88 extending in the radial direction. Besides, even if the opening action of the relief part 76 is repeatedly performed, a tensile load is less likely to act on the radial reinforcing rib 88, so that damage to the radial reinforcing rib 88, which is a narrow ridge, can be readily avoided. In the present practical embodiment, since the radial reinforcing rib 88 extends linearly in the radial direction, it is possible to efficiently exert an influence of the radial reinforcing rib 88 on the opening action of the relief part 76 (the flexural deformation of the movable film 66).

Only one radial reinforcing rib 88 is provided to each relief part 76. This prevents the radial reinforcing ribs 88 from exerting an excessively large influence on the deformation rigidity of the liquid-pressure absorbing part 78, thereby excellently attaining the vibration damping effect (the liquid-pressure absorbing action) due to the elastic deformation of the liquid-pressure absorbing part 78. Besides, the radial reinforcing rib 88 is arranged in the circumferentially center of the relief part 76. Therefore, tuning of the deformation rigidity of the movable film 66 by means of the radial reinforcing rib 88 can be performed in a balanced manner in the circumferential direction, so that troubles such as deformation of the relief part 76 during the opening action becoming distorted can be easily avoided.

When the movable film 66 undergoes arcuate-shaped flexural deformation so as to be convex upward as shown in FIG. 12, the deformation-regulator projection 84, which is provided on the radially inner side of the protrusion 80, may come into contact with the lid member 44 prior to the protrusion 80. By so doing, the movable film 66 comes into contact with the lid member 44 in a stepwise manner at the deformation-regulator projection 84 and at the protrusion 80, so that the momentum of the strike of the protrusion 80 against the lid member 44 is reduced, thereby decreasing the striking noise. The deformation-regulator projection 84 has an upper surface area smaller than that of the protrusion 80, and has a tapered shape at least at the distal end portion. Thus, the impact during contact with the lid member 44 is relatively small, and the striking noise is unlikely to be a problem. In addition, the radial reinforcing rib 88 is provided below the deformation-regulator projection 84, and for example, by achieving reduction in striking speed of the deformation-regulator projection 84 against the lid member 44 by means of the radial reinforcing rib 88, occurrence of the striking noise is prevented.

Regarding the movable film 66 displaced upward due to the negative pressure in the pressure-receiving chamber 90, when the positive pressure acts on the pressure-receiving chamber 90, for example, the movable film 66 is displaced downward and comes into contact with the bottom wall inner surface of the housing recess 46. In this case as well, the mode of deformation in which the movable film 66, which has deformed into an arcuate shape, returns to its initial shape is controlled by the radial reinforcing rib 88, so that the striking noise caused by the strike of the movable film 66 against the partition main body 42 is reduced.

Moreover, since the annular cushioning projection 86 projects from the lower surface of the movable film 66, the striking noise generated when the movable film 66 comes into contact with the bottom wall inner surface of the housing recess 46 is reduced also by the cushioning action of the annular cushioning projection 86. Since the annular cushioning projection 86 has a projection height larger than that of the radial reinforcing rib 88, the annular cushioning projection 86 preferentially comes into contact with the partition main body 42, and can obtain a greater cushioning action.

Figure 13:
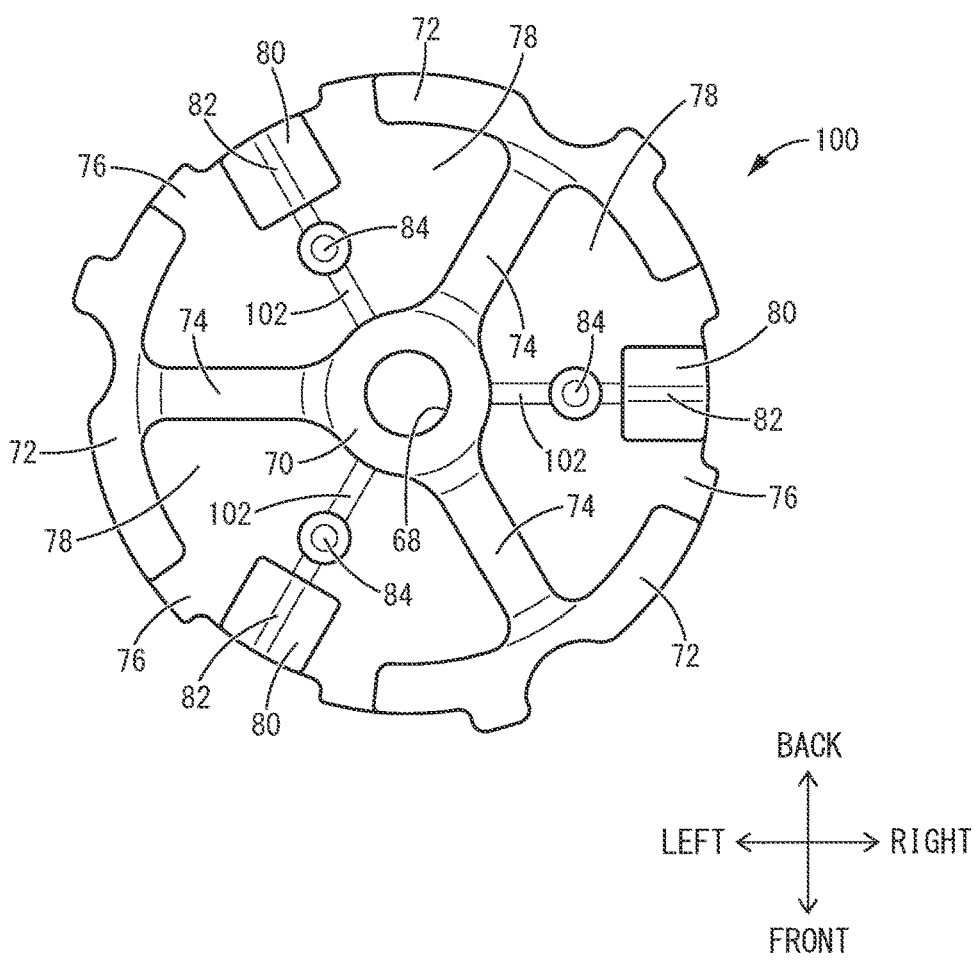
FIG. 13 is a top plan view of a movable film constituting an engine mount as a second practical embodiment of the present disclosure.

FIG. 13 depicts a movable film 100 serving as a rubber elastic plate that constitutes an engine mount as a second practical embodiment of the present disclosure. In the following description, components and parts that are substantially identical with those in the first practical embodiment will be assigned like symbols and not described in any detail. Also, the other parts of the engine mount that are not shown in FIG. 13, which are exemplified by the same structure as in the first practical embodiment, will not be described in any detail.

The movable film 100 is provided with radial reinforcing ribs 102 on the upper surface of the liquid-pressure absorbing part 78. Each radial reinforcing rib 102 has, for example, a shape obtained by turning the radial reinforcing rib 88 of the first practical embodiment vertically upside down, and is tapered upward. The radial reinforcing rib 102 extends outward from the inside contact-retainer part 70 toward the relief part 76, and in the present practical embodiment, is provided radially between the inside contact-retainer part 70 and the protrusion 80 with its opposite ends being continuous with the inside contact-retainer part 70 and the protrusion 80. The radial reinforcing rib 102 is provided on both the radially inner side and the radially outer side of the deformation-regulator projection 84. The projection height dimension of the radial reinforcing rib 102 is smaller than all of the projection height dimensions of the inside contact-retainer part 70, the protrusion 80, and the deformation-regulator projection 84. The projection height dimension and the width dimension of the radial reinforcing rib 102 are smaller than those of the reinforcing connection part 74.

Such a movable film 100 structured according to the present practical embodiment can be adopted in place of the movable film 66 in the engine mount 10 of the first practical embodiment. With the movable film 100 of the present practical embodiment, as in the first practical embodiment, the radial reinforcing rib 102 contributes to the deformation rigidity of the movable film 100, so that the displacement of the relief part 76 can be controlled. Accordingly, it is possible to control the opening mode of the relief passage with respect to the drop in the internal pressure of the pressure-receiving chamber while suppressing the influence on the minute pressure-fluctuation absorbing function of the liquid-pressure absorbing part 78.

Regarding the radial reinforcing ribs 102 formed on the upper surface of the rubber elastic plate shown in the present practical embodiment and the radial reinforcing ribs 88 formed on the lower surface of the rubber elastic plate shown in the first practical embodiment, both of them may be provided, or only one of them may be provided.

While the present disclosure has been described in detail hereinabove in terms of the practical embodiments, the disclosure is not limited by the specific description thereof. For example, in the preceding practical embodiments, three liquid-pressure absorbing parts 78 and three relief parts 76 are provided. However, the number of liquid-pressure absorbing parts and the relief parts is not particularly limited, and may be one, or may alternatively be two or more.

The radial reinforcing ribs 88 may be provided in plurality for one relief part 76. In this case, the plurality of radial reinforcing ribs 88 are preferably arranged symmetrically in the circumferential direction with respect to the circumferential center of the relief part 76. For example, in the case where an even number of radial reinforcing ribs 88 are formed, equal numbers of the radial reinforcing ribs 88 can be arranged on the circumferentially opposite sides off the circumferential center of the relief part 76.

The shape of the radial reinforcing rib is not limited to the one that extends linearly, and for example, a shape that extends in the radial direction while curving, bending, or the like in the circumferential direction can also be adopted. Besides, the radial reinforcing ribs do not necessarily have to extend along the radial line, and may, for example, have a shape extending radially while inclining with respect to the radial direction.

The projection height dimension of the radial reinforcing rib may be larger than that of the annular cushioning projection. Also, the width dimension of the radial reinforcing rib may be larger than that of the annular cushioning projection. That is, the cross-sectional shape and the cross-sectional area (the projection height dimension and the width dimension) of the radial reinforcing rib are set such that the deformation rigidity of the movable film (the opening action characteristics of the elastic deformation zone) is appropriately adjusted. The cross-sectional shape of the radial reinforcing rib does not need to be constant in the length direction, and may change partially or gradually in cross-sectional shape such as height and width, and the radial reinforcing rib may be divided in the length direction or the like. Furthermore, in the preceding practical embodiments, the radial reinforcing rib extends from the approximately radially inner end to the approximately radially outer end of the liquid-pressure absorbing part, but the positions of the radially inner end and the radially outer end of the radial reinforcing rib are settable by tuning and are not limited. However, considering the transmission action of the elastic deformation and the stress to the relief part as described above, the radial reinforcing rib is preferably configured such that the radially inner end extends so far as the radially inner side with respect to the radial center of the liquid-pressure absorbing part, while the radially outer end reaches so far as the protrusion.

Whereas the radial reinforcing rib preferably has a tapered cross-sectional shape whose width dimension decreases toward the projecting distal end, the radial reinforcing rib may have, for example, an approximately rectangular cross-sectional shape that projects with an approximately constant width dimension or the like.

It is also conceivable to utilize the protrusion provided on the relief part as a mass member of the mass-spring system. Specifically, a mass-spring system is configured with the protrusion as a mass member and the relief parts on the circumferentially opposite sides of the protrusion and the liquid-pressure absorbing part on the radially inner side of the protrusion as springs, and the resonance frequency of the said mass-spring system is set in consideration of the tuning frequency of the orifice passage or the like. With this configuration, by utilizing the resonance of the mass-spring system, it is also possible to realize a prompt opening action of the relief part as required during input of a large impact load or the like while preventing an unnecessary opening action of the relief part in the frequency range where, for example, vibration damping effect by means of the orifice passage and the liquid-pressure absorbing part is expected. Note that not only the protrusion but also the deformation-regulator projection can be utilized as a mass member. Besides, instead of or in addition to the protrusion, a member having a high specific gravity such as metal can be fastened to the relief part and utilized as a mass member or the like.

The protrusion is not essential in the rubber elastic plate. For example, by providing a protruding part projecting toward the elastic deformation zone on the displacement-regulator part (the lid member 44) that covers the pressure-receiving chamber side of the elastic deformation zone of the rubber elastic plate, it is also possible to limit the amount of deformation of the elastic deformation zone toward the pressure-receiving chamber side by means of the protruding part. Note that the deformation-regulator projection is not essential in the rubber elastic plate either. Besides, in the rubber elastic plate, it is not always necessary to provide the reinforcing connection part 74 extending radially inward from the outside contact-retainer part 72 that extends in the circumferential direction in the radially outer portion. It would also be possible to constitute the liquid-pressure absorbing part 78 by means of a region extending in an annular shape about the entire circumference.

The radial cushioning projection 82 provided on the upper surface of the protrusion 80 may be omitted. If the radial cushioning projection 82 is omitted, it is desirable to adopt another structure for reducing the striking noise, in which, for example, the protrusion has a tapered shape, a cushioning projection extending in the circumferential direction or a spot-shaped cushioning projection is provided on the upper surface of the protrusion, or the like.

The specific structures of the first attachment member 12, the second attachment member 14, the main rubber elastic body 16, the flexible film 36, and the like are not particularly limited. Publicly known structures disclosed in the conventional fluid-filled vibration damping device can be suitably applied.

What is claimed is:

1. A fluid-filled vibration damping device comprising:
a pressure-receiving chamber and an equilibrium chamber which are filled with a non-compressible fluid;
a partition partitioning the pressure-receiving chamber and the equilibrium chamber, the partition being provided with a communication aperture through which the pressure-receiving chamber and the equilibrium chamber are held in communication; and
a rubber elastic plate arranged in the partition such that the communication aperture is covered from a pressure-receiving chamber side, the rubber elastic plate being configured to undergo elastic deformation due to a differential between pressures in the pressure-receiving chamber and the equilibrium chamber exerted on respective surfaces of the rubber elastic plate such that a minute pressure-fluctuation absorbing function is exhibited based on the elastic deformation, wherein the rubber elastic plate comprises:
a first outside contact-retainer part and a second outside contact-retainer part provided partially along a circumference at a radially outer edge of the rubber elastic plate, the first outside contact-retainer part and the second outside contact-retainer part being held in an overlapped state with the partition;
an elastic deformation zone provided circumferentially between the first outside contact-retainer part and the second outside contact-retainer part of the rubber elastic plate, the elastic deformation zone being configured to become apart from the partition based on the differential between the pressures in the pressure-receiving chamber and the equilibrium chamber such that a fluid flow is allowed from the equilibrium chamber to the pressure-receiving chamber through the communication aperture; and
a radial reinforcing rib projecting from at least one of the surfaces of the rubber elastic plate and extending radially outward from an inside contact-retainer part that is held in the overlapped state with the partition toward the elastic deformation zone,
wherein the radial reinforcing rib projects toward the equilibrium chamber, and
wherein an annular cushioning projection extending in a circumferential direction is provided on the rubber elastic plate and projects toward the equilibrium chamber, and a projection height dimension of the radial reinforcing rib is smaller than that of the annular cushioning projection.

2. The fluid-filled vibration damping device according to claim 1, wherein a radially outer end of the radial reinforcing rib is positioned at a circumferential center of the elastic deformation zone.

3. The fluid-filled vibration damping device according to claim 1, wherein a quantity of the radial reinforcing rib provided for the elastic deformation zone is one.

4. The fluid-filled vibration damping device according to claim 1, wherein the radial reinforcing rib extends linearly in a substantially radial direction of the rubber elastic plate.

5. A fluid-filled vibration damping device comprising:
a pressure-receiving chamber and an equilibrium chamber which are filled with a non-compressible fluid;
a partition partitioning the pressure-receiving chamber and the equilibrium chamber, the partition being provided with a communication aperture through which the pressure-receiving chamber and the equilibrium chamber are held in communication; and
a rubber elastic plate arranged in the partition such that the communication aperture is covered from a pressure-receiving chamber side, the rubber elastic plate being configured to undergo elastic deformation due to a differential between pressures in the pressure-receiving chamber and the equilibrium chamber exerted on respective surfaces of the rubber elastic plate such that a minute pressure-fluctuation absorbing function is exhibited based on the elastic deformation, wherein the rubber elastic plate comprises:
a first outside contact-retainer part and a second outside contact-retainer part provided partially along a circumference at a radially outer edge of the rubber elastic plate, the first outside contact-retainer part and the second outside contact-retainer part being held in an overlapped state with the partition;
an elastic deformation zone provided circumferentially between the first outside contact-retainer part and the second outside contact-retainer part of the rubber elastic plate, the elastic deformation zone being configured to become apart from the partition based on the differential between the pressures in the pressure-receiving chamber and the equilibrium chamber such that a fluid flow is allowed from the equilibrium chamber to the pressure-receiving chamber through the communication aperture; and a radial reinforcing rib projecting from at least one of the surfaces of the rubber elastic plate and extending radially outward from an inside contact-retainer part that is held in the overlapped state with the partition toward the elastic deformation zone, wherein the elastic deformation zone is provided with a protrusion projecting toward the pressure-receiving chamber, a pressure-receiving chamber side of the protrusion is covered with a displacement-regulator part provided to the partition, and the radial reinforcing rib is provided at a position corresponding to the protrusion in a circumferential direction of the rubber elastic plate.

6. The fluid-filled vibration damping device according to claim 5, wherein a projecting distal end face of the protrusion has a surface shape corresponding to that of the displacement-regulator part, and the projecting distal end face of the protrusion is provided with a radial cushioning projection extending in a radial direction of the rubber elastic plate.

7. The fluid-filled vibration damping device according to claim 5, wherein a deformation-regulator projection is provided on a radially inner side of the protrusion of the rubber elastic plate, the deformation-regulator projection being arranged side by side with the protrusion in a radial direction, and the radial reinforcing rib extends astride the protrusion and the deformation-regulator projection continuously in the radial direction, and extends to the radially inner side with respect to the deformation-regulator projection.

* * * * *